(12) United States Patent
Langle et al.

(10) Patent No.: US 8,506,686 B2
(45) Date of Patent: Aug. 13, 2013

(54) REEL-TO-REEL BIOFORENSIC AEROSOL COLLECTION AND STORAGE SYSTEM

(75) Inventors: Joseph M. Langle, Kansas City, MO (US); Michael F. Fischer, Lee's Summit, MO (US); James M. Egan, Olathe, KS (US); Alexander J. Waller, Olathe, KS (US); Joseph W. Clement, Kansas City, MO (US); Darren J. Radke, Overland Park, KS (US)

(73) Assignee: Midwest Research Institute, Inc., Kansas City, MO (US)

( * ) Notice: Subject to any disclaimer, the term of this patent is extended or adjusted under 35 U.S.C. 154(b) by 389 days.

(21) Appl. No.: 13/019,494

(22) Filed: Feb. 2, 2011

(65) Prior Publication Data

US 2011/0185904 A1    Aug. 4, 2011

Related U.S. Application Data

(60) Provisional application No. 61/301,102, filed on Feb. 3, 2010.

(51) Int. Cl.
*B03C 3/47* (2006.01)
(52) U.S. Cl.
USPC .............. 96/39; 53/545; 96/19; 96/25; 96/42; 96/43; 96/94; 422/66; 493/189; 493/194
(58) Field of Classification Search
USPC ........... 96/19, 25, 39–43, 52, 94, 98; 53/545; 422/62, 66, 83, 88; 493/189, 194
See application file for complete search history.

(56) References Cited

U.S. PATENT DOCUMENTS

| | | | |
|---|---|---|---|
| 2,076,554 A | | 4/1937 | Drinker et al. |
| 2,100,155 A | * | 11/1937 | Beran ............................... 96/39 |
| 2,486,877 A | * | 11/1949 | Ransburg et al. ................. 96/42 |
| 3,088,364 A | | 5/1963 | Rozsa et al. |
| 3,128,239 A | | 4/1964 | Page |

(Continued)

FOREIGN PATENT DOCUMENTS

| | | | |
|---|---|---|---|
| GB | 951120 | 3/1964 | |
| JP | 53-5468 A | * 1/1978 | ........................ 96/94 |
| WO | 2009091410 A1 | 7/2009 | |

OTHER PUBLICATIONS

Search Report and Written Opinion from PCT/US2011/023443 dated Jan. 19, 2012.

*Primary Examiner* — Richard L Chiesa
(74) *Attorney, Agent, or Firm* — Husch Blackwell LLP; Samuel Digirolamo

(57) ABSTRACT

A reel-to-reel aerosol collection and storage system for capturing and storing a plurality of separate samples of aerosol particles using electrostatic precipitation technology for collecting such particles onto a tape mechanism for analysis at a future time. The particles are collected onto a region of the collection tape for a defined period of time and then that portion of the collection tape is advanced out of the collection zone and manipulated so as to form sealed pouches or pockets which can be either severed from the collection tape for individual storage in a temperature controlled storage container, or which can be stored on a take-up reel in a temperature controlled environment. The collected aerosol particles are stored with a buffer fluid to preserve and maintain the viability of the collected particles for future extraction and analysis. Several embodiments for forming sealed pouches or pockets and methods of storing the collected particles are disclosed.

40 Claims, 9 Drawing Sheets

(56) References Cited

U.S. PATENT DOCUMENTS

| | | |
|---|---|---|
| 3,260,413 A | 7/1966 | Natelson |
| 1,129,212 A | 10/1968 | Williams et al. |
| 3,454,801 A | 7/1969 | Suzuki et al. |
| 3,462,909 A | 8/1969 | Anderson |
| 3,526,480 A | 9/1970 | Findl et al. |
| 4,023,398 A | 5/1977 | French et al. |
| 4,192,176 A | 3/1980 | Barringer |
| 4,220,414 A | 9/1980 | Barringer |
| 4,808,827 A | 2/1989 | Woollam |
| 5,037,611 A | 8/1991 | Ledford, Jr. |
| 5,339,700 A | 8/1994 | Wright et al. |
| 6,228,657 B1 | 5/2001 | Genovese et al. |
| 6,648,948 B1 * | 11/2003 | Moriyama .................. 96/42 |
| 6,761,016 B1 | 7/2004 | Soleri |
| 6,938,777 B2 | 9/2005 | Call et al. |
| 6,958,088 B1 * | 10/2005 | Moriyama .................. 96/39 |
| 6,964,189 B2 | 11/2005 | Carlson et al. |
| 7,113,277 B2 | 9/2006 | Craig |
| 7,197,911 B1 | 4/2007 | Lilienfeld |
| 7,243,560 B2 | 7/2007 | Coyle et al. |
| 7,295,308 B1 | 11/2007 | Samuels |
| 7,454,988 B2 | 11/2008 | Tan |
| 7,518,710 B2 | 4/2009 | Gao et al. |
| 7,532,314 B1 | 5/2009 | Black et al. |
| 7,578,973 B2 | 8/2009 | Call et al. |
| 2006/0257287 A1 | 11/2006 | Call et al. |
| 2007/0019193 A1 | 1/2007 | Craig |
| 2007/0186696 A1 | 8/2007 | Pletcher et al. |
| 2007/0295208 A1 * | 12/2007 | Fairchild .................. 95/74 |
| 2010/0261611 A1 | 10/2010 | Peters |

* cited by examiner

REEL-TO-REEL BIOFORENSIC AEROSOL COLLECTION AND STORAGE SYSTEM

CROSS-REFERENCE TO RELATED APPLICATIONS

This application claims priority to U.S. Provisional Patent Application Ser. No. 61/301,102, which was filed on Feb. 3, 2010. This disclosure is incorporated by reference.

BACKGROUND OF INVENTION

The present invention relates generally to air sampling and collection systems for capturing and analyzing particulate matter from a particular environment and, more particularly, to several embodiments of a reel-to-reel aerosol collection and storage system which is designed to capture chemical, biological and other aerosols from the air using electrostatic precipitator technology onto a tape mechanism which is stored in a particular fashion for preservation of the collected contaminants for future analysis.

The monitoring and collection of atmospheric particulate matter continues to grow in today's global environment due to the threat of biological and chemical warfare. There are many applications in which it is desirable to collect and capture air samples from a particular environment such as collecting air samples in large public gathering spaces where there is the threat of a terrorist release of a harmful aerosol or collecting air samples in livestock buildings to monitor for the spread of deadly diseases. As a result, there is an increasing demand for air sampling systems which can be used for a variety of different applications including military, private or individual use, all of which are capable of collecting a wide variety of different types of airborne particles. These particles may include biological warfare agents, naturally occurring biological material such as mold and pollen, chemical warfare agents, nuclear/radiological materials, and other naturally occurring or artificially produced airborne aerosol and pathogen particles or spores. Development of early warning systems in this area is of particular interest to government agencies around the world as the process of environmental monitoring for and collection of hazardous airborne particulate matter or contaminants presents numerous technical challenges.

Many different types of sampling devices exist today for capturing samples of trace elements or contaminants from a particular environment for both real time analysis and storage for future analysis. Once collected, such samples are analyzed to determine the nature of the particles involved, the level of contamination in the air, and the degree of risk personnel may be exposed to in the contaminated area. While there are many different types of air sampling systems which store the collected airborne particulate matter for future analysis, such known prior art systems struggle with collecting and preserving the collected contaminants for future analysis. If the contaminants are not properly collected and stored, degradation of the collected particles may occur during collection and storage, and recovery or extraction of the collected particles from the stored medium for future analysis may be difficult and may likewise destroy or degrade the sample particles. In addition, some of the collection and storage systems are large, bulky and complicated; some are not adapted for the collection and storage of a large plurality of samples for future analysis; and some of the known prior art air sampling systems are not practical for private or individual use, or for constant monitoring of a particular site location over an extended period of time.

It is therefore desirable to provide an aerosol collection and storage system which can efficiently collect and properly store a large plurality of particulate matter samples for analysis at a later time wherein storage and recovery of the sample particulate matter from the collection medium is easily achieved and the recovery process does not destroy or degrade the sample particles. It is also desirable to collect and store pertinent information regarding each individual sample such that such information can be accessed by a user when each sample is finally analyzed at a future time and place.

Accordingly, the present invention is directed to a bioforensic aerosol collection and storage system which overcomes one or more of the problems set forth above.

SUMMARY OF INVENTION

The present invention overcomes many of the shortcomings and limitations of the prior art devices and teaches the construction and operation of several embodiments of a reel-to-reel bioforensic aerosol collection and storage system used to capture and store particulate matter wherein the collection mechanism uses electrostatic precipitation technology for collecting the particulate matter onto a tape mechanism which is stored for future analysis. Particles are captured onto a tape material coated with a water soluble material. The particles are collected onto a region of the tape for a defined period of time and then the tape is advanced out of the collection zone. As the tape advances, several different methods can be used to manipulate the tape such that the collected particulate matter is stored with a buffer fluid to preserve and maintain the viability of the collected particles for future extraction and analysis. The collection material or particulate matter intended to be collected by the various embodiments of the present device includes, but is not limited to, biological warfare agents, naturally occurring biological material, chemical warfare agents, nuclear/radiological materials, and other airborne aerosol and pathogen agents.

In one aspect of the present invention, the present aerosol sampler and storage system draws air into an inlet via a fan or other blower system. The air flow with the particulate matter contained therein is drawn across a collection zone which includes a system for electrically charging the aerosol particles as they flow through the collection zone. In one embodiment, the aerosol particles entering the system are exposed to gas ions generated by a corona discharge from an electrode as they flow through an electrostatic field. The aerosol particles become electrically charged and then migrate to an oppositely charged collection surface. In one embodiment, the collection surface may be a grounded plate which is covered by an advanceable tape. The tape is advanced from a feed reel, across the collection surface, and into an area wherein the tape with the collected particles thereon is acted upon to preserve and store the collected particles for future analysis.

In one embodiment of the present invention, once the tape is moved out of the collection zone, a mechanism is used to move the tape downwardly in between a pair of plate members which include heat sealing means and cutting means for forming sealed pouches. Once the tape has been drawn down in between the pair of plate members, the plate members are moved into contact with each other thereby folding the tape lengthwise upon itself and two sides of the tape are pressed and heat-sealed together to form a pouch having only one side remaining open. A dispensing mechanism is then used to inject a small portion of a buffer fluid into the pouch prior to heat-sealing the final side of the pouch. At the same time, an upper portion of the overlapped tape is likewise heat-sealed at a location above the location where the final side of the pouch is heat-sealed. Once the tape has been heat-sealed at both of the above-referenced locations, the tape is cut or severed in between such locations thereby allowing a totally sealed pouch to fall into a temperature controlled cold storage container located therebelow. Once the sealed pouch has been cut from the tape, the remaining portion of the tape which has also been heat-sealed at a location above where the sealed pouch was severed from the tape now continues to advance onto a waste or take-up reel. Heat-sealing the folded over tape at a location above the location where the sealed pouch is finally sealed and cut allows the tape to remain continuous for further advancement so that the next sample can be collected in the collection area. This collection process can be repeated at any predetermined time intervals and any plurality of sample pouches can be formed, heat-sealed, and severed for collection in a storage container for evaluation and analysis at a later time. In this regard, the present system includes a user programmable interface for allowing a user to program a wide variety of different sampling times, frequencies and other parameters into the present system depending upon the particular application.

Each sample pouch is also pre-marked with a barcode serial number or other data identification means. The barcode can be prepositioned on the tape at predetermined intervals along its entire length, or the reel-to-reel mechanism could insert a barcode onto each pouch as it is formed prior to being cut and stored in the storage container. The barcode is automatically read immediately after collection and the onboard computer system will record the barcode serial number along with any other pertinent information relating to that particular sample such as sampling start and stop times, sample flow rates, sampling duration times and frequencies, and so forth. This information is then stored in a database for access at a later time when the sample is being analyzed.

The collection tape is preferably coated with a water-soluble coating which allows for easy recovery of the collected particles once the stored pouches are removed for analysis and aids in the complete extraction of the collected material from the tape surface. The water-soluble coating should be applied at least to the collection area of the tape in order to aid in recovery of the sample particulate particles. This coating should not be on the surfaces of the tape which are going to be heat-sealed as this may degrade the sealing effect. In another embodiment of the present invention, it is recognized and anticipated that once the individual sample pouches are heat-sealed to the collection tape, they can remain on the tape and can be collected and stored on the take-up reel in a temperature controlled environment similar to the storage container. This embodiment eliminates the need to cut or sever the tape as previously explained. Instead, the take-up reel can be unrolled and the individual pouches stored thereon can be manually severed from the tape for future analysis. It is also recognized and anticipated that the collection tape can be folded over width-wise, instead of length-wise, and thereafter either heat-sealed and cut free from the collection tape, or the sample pouches can remain on the take-up reel for storage as previously explained.

Still further, in another embodiment of the present invention, the buffer fluid is pre-applied to a microfiber pad which is unrolled from a reel and placed in contact with the collected material on the collection tape. The two tapes are then placed in contact with each other and form a sealed pocket around the sample particles. This sealing can occur by either sealing the two tapes together such as through the use of an adhesive on one tape, or via heat-sealing as explained above. Again, the small volume of buffer fluid is included in each pouch in order to help maintain the viability of the sample.

The present system will enable easy insertion and removal of the collection tape and other tapes similar to the complexity of loading film into a camera. New sterilized tapes can be provided in consumable cartridges which can be easily replaced. In one embodiment, the collection tape will be contained on a reel inside another consumable cartridge. The consumable cartridge will provide secondary containment to the collection tape for safe transport. Where the sample particulate matter is stored on a take-up reel, the stored samples can likewise be contained on a take-up reel which is contained in a cartridge or other containment system for safe storage and transportation. While attached to the present system, the stored samples on the take-up reel can likewise be cooled to an appropriate temperature through the storage or take-up reel.

After transport to a suitable laboratory or other remote analysis location, any sample of interest can be located via the barcode and removed for processing. To remove a sample, the operator will simply cut the pouch from the strip of pouches, or locate the appropriate severed pouch. The individual samples will remain sealed and the pouch containing the sample of interest will be cut open. Depending upon the final configuration of the sample pouch, an appropriate recovery procedure or protocol will be used to extract the sample particulate matter from the sample pouch.

The present reel-to-reel electrostatic aerosol collection and storage system can be optimized by varying field density and collection zone length to achieve any stated particle capture efficiency requirement for a particular range of particle sizes and flow rates. Because electrostatic attraction is the collection mechanism, efficient collection can be maintained over a greater range of sampling rates as compared to inertial based collectors. Collection of biological particles using electrostatic precipitation does not affect the viability of the particles. In addition, using selected buffer fluids in a sealed sample pouch further maintains the viability of the sample particles. The present system also includes on-board data storage for recording system status, collection times, and other time-sensitive data. This data is retrievable with the sample pouches or through a secure remote access line. Additionally, an aerosol counter/sizer can be incorporated into the present system and this data will also be stored and retrievable. The present system is also portable and is designed to autonomously operate for an extended period of time on a 110 volt AC power. Due to the low power requirements of electrostatic precipitators, the present system may also include an onboard battery capable of several hours of fully operational collection time in the event of a power outage.

These and other aspects and advantages of the present system will become apparent to those skilled in the art after considering the following detailed description in connection with the accompanying drawings.

DETAILED DESCRIPTION

Figure 1:
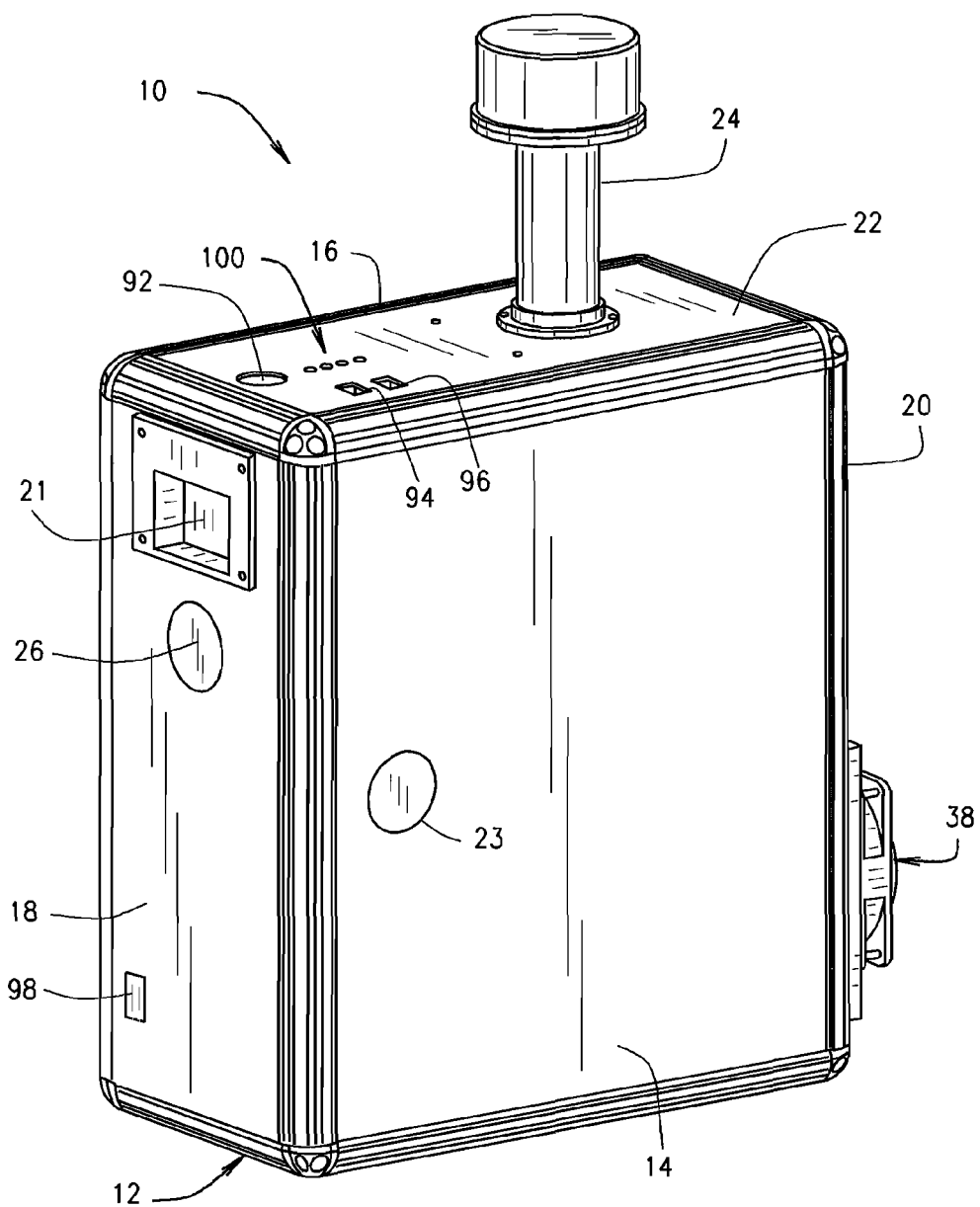
FIG. 1 is a perspective view of one embodiment of the present reel-to-reel aerosol collection and storage system constructed in accordance with the teachings of the present invention, the present system being shown enclosed within its housing.

Referring to the drawings more particularly by reference numbers wherein like numerals refer to like parts, the number 10 in FIGS. 1-4 identifies one embodiment of the present reel-to-reel bioforensic aerosol collection and storage system constructed according to the teachings of the present invention. The present system 10 is completely contained within a housing or case unit 12 as illustrated in FIG. 1 and includes a plurality of access panels such as panel members 14, 16, 18, 20 and 22, at least some of which may be removably attachable to the housing framework for providing access to the various components comprising the present system stored within the housing 12. The present system 10 is a compact tabletop size unit that is portable and can be moved from one location to another for collection and storage of a large number of discreet samples for later analysis via a pair of handle members such as the handle member 21 illustrated in FIG. 1. At least some of the panel members such as panel members 14, 16 and 22 may be removably attachable to the overall unit 10 in a conventional manner and panel member 14 may function as a door. All or some of the respective panel members may likewise include a key lock or other locking mechanism such as the handle/lock mechanism 23 for allowing controlled access to the interior components of the present system. The present system 10 is specifically designed to be used in the field enclosed within the housing 12 as illustrated in FIG. 1.

Figure 2:
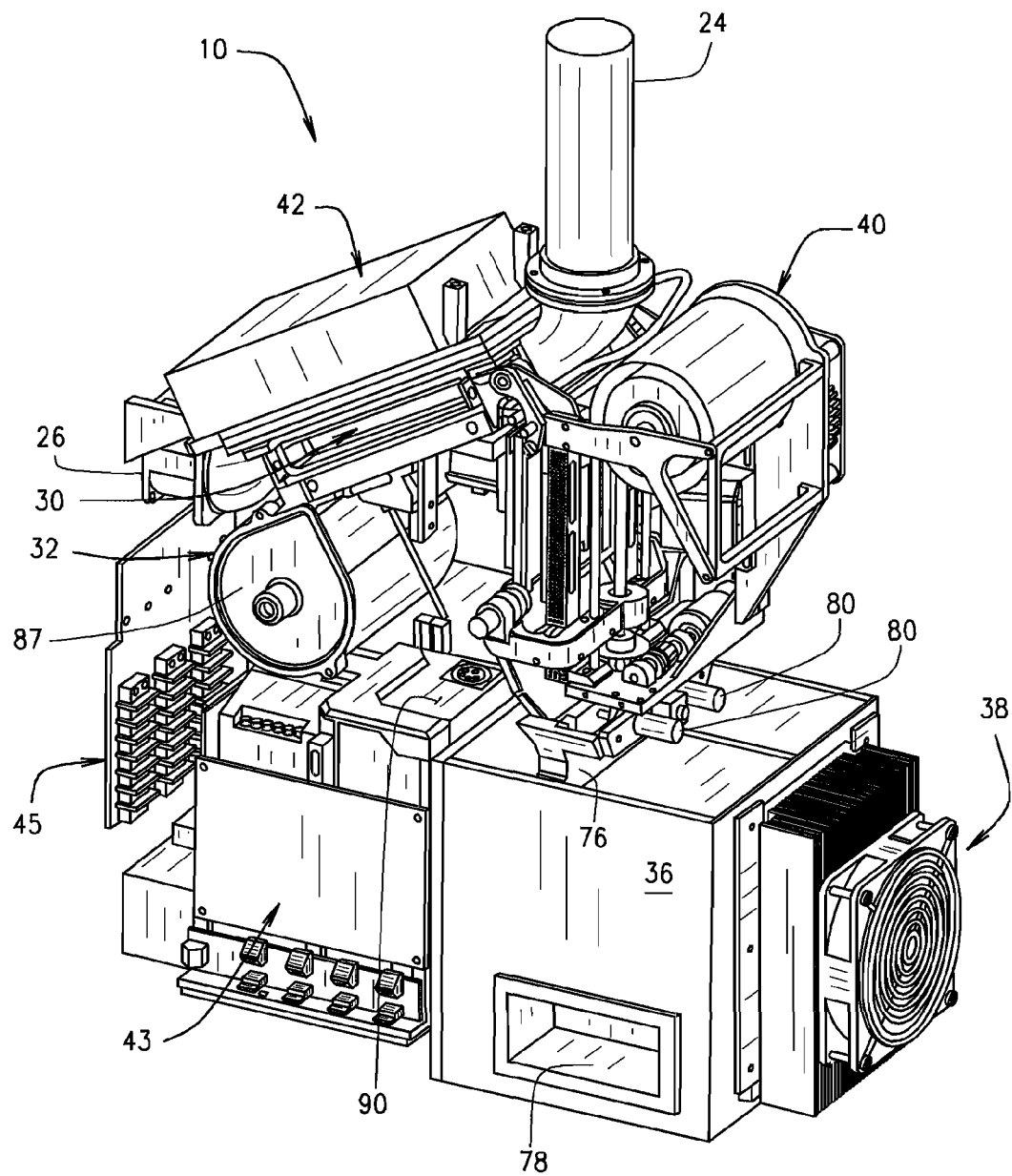
FIG. 2 is a perspective view of the present aerosol collection and storage system of FIG. 1 showing the housing removed and showing internal components of the system including the on-board computer system and its associated electronics package.
Figure 3:
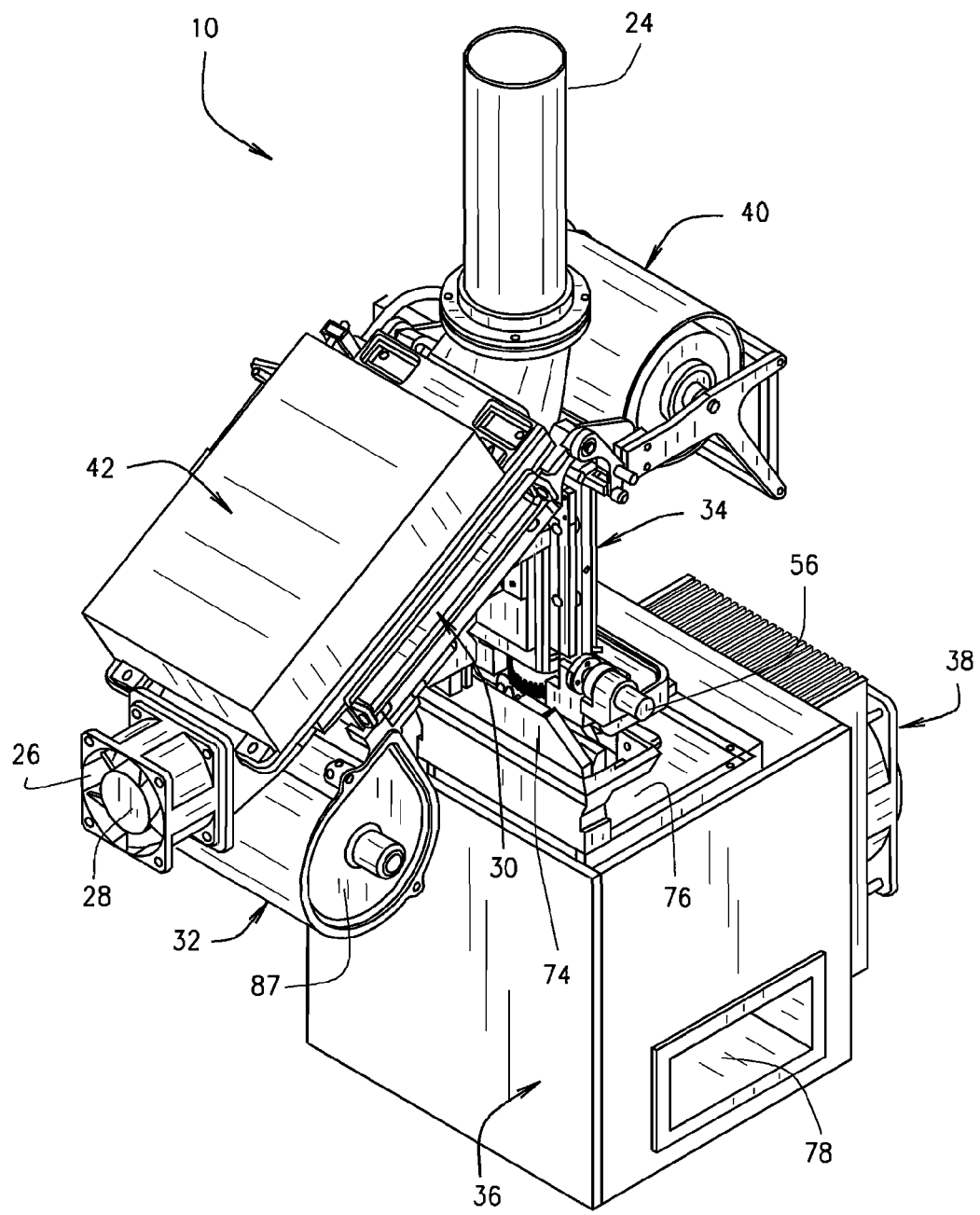
FIG. 3 is a perspective view of the present aerosol collection and storage system similar to FIG. 2 with the on-board computer system and its associated electronics package removed for clarity.
Figure 4:
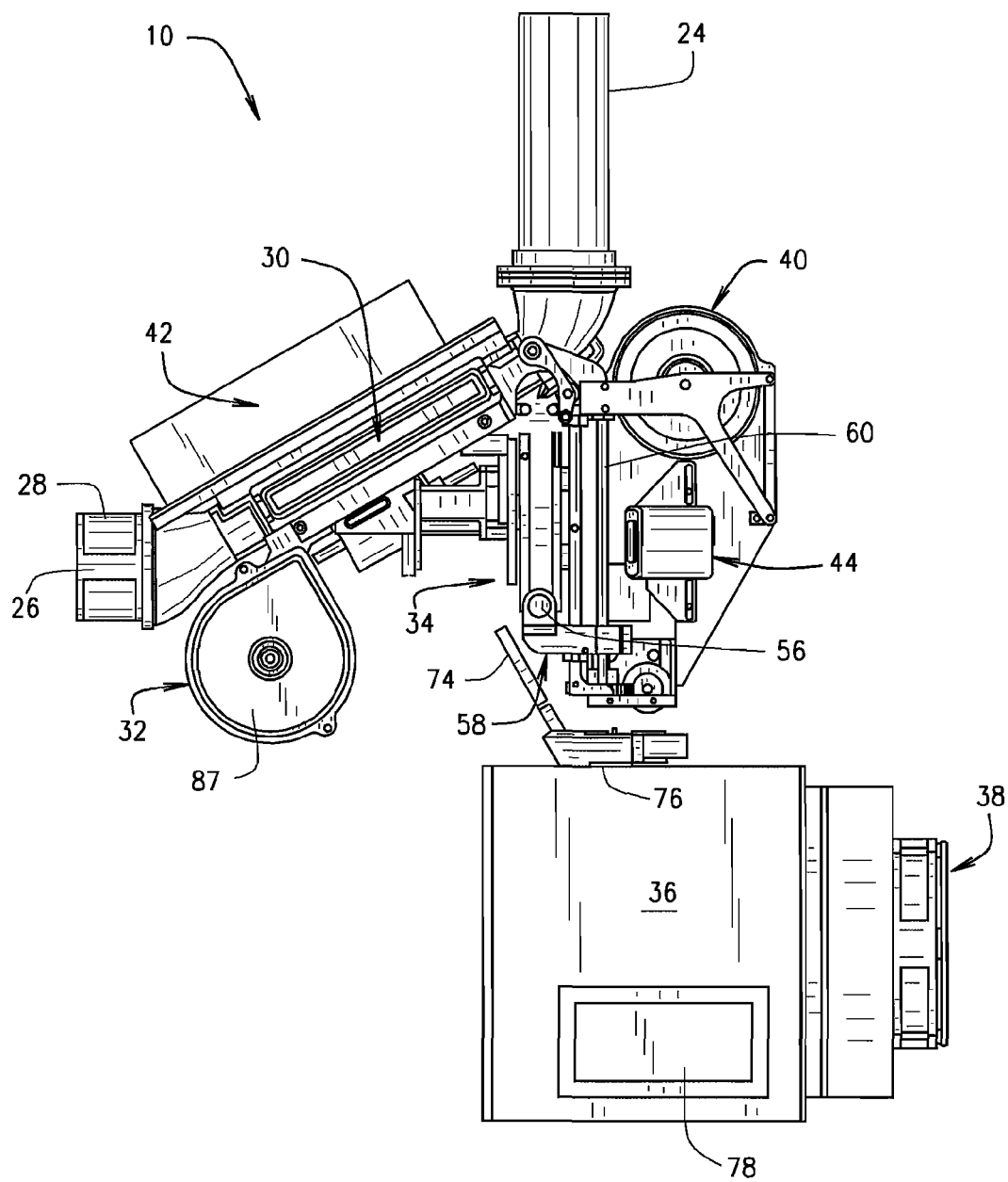
FIG. 4 is a front elevational view of the embodiment illustrated in FIG. 3.

FIGS. 2-4 illustrate perspective and elevational views of the overall collection and storage system 10, FIG. 2 showing the on-board computer system 43 and electronics package 45 and FIGS. 3 and 4 showing the present system 10 with the computer system and electronics package removed for clarity purposes. The present system 10 includes an air inlet 24, an air outlet 26, a fan or other blower system 28 for drawing ambient air into the air inlet 24 and pulling such air across a collection zone 30 which includes an electrostatic precipitator system for electrically charging the aerosol particles as they flow through the collection zone 30 en route to the air outlet 26. The present system 10 likewise includes a first web roll reel 32 which holds the unexposed collection tape or other web material for movement through and across the collection zone 30 and into an area 34 where the tape with collected particles stored thereon is acted upon by a mechanism which folds the collection tape and forms sealed pouches for preserving and storing the collected particles therewithin for future analysis. The collection pouches are then severed from the tape or web material and are stored in a cold storage container 36 which includes a thermo-electric cooler 38 for controlling the temperature of the storage unit 36 at the appropriate temperature for preserving the collected particles and for promoting longevity of such stored collected particles. The present system 10 likewise includes a take-up storage reel 40 for storing the excess tape after the individual pouches are severed therefrom and a high voltage power supply unit 42 for powering the electrostatic precipitator collection mechanism housed above the collection zone 30. The present system 10 likewise includes a bar code scanner 44 as best illustrated in FIG. 4 for reading a bar code associated with each sealed collection pouch formed by the present system immediately after collection and an on-board computer system 43 and an electronics package 45 for controlling the operation of the present system 10. The electronics package 45 is electrically connected to the on-board computer system 43 and includes appropriate microprocessors, software, programming and other electronic means for controlling and sequencing all of the operations of the present system and for carrying out the functionality of the present system as will be hereinafter explained. The computer system 43 through the electronics package 45 and the bar code scanner 44 likewise coordinates and stores other pertinent information associated with each particular sample with the bar code serial number for that sample as the collection pouches are formed. This information in is then stored in a database for access at a later time when the sample is being analyzed.

Figure 5:
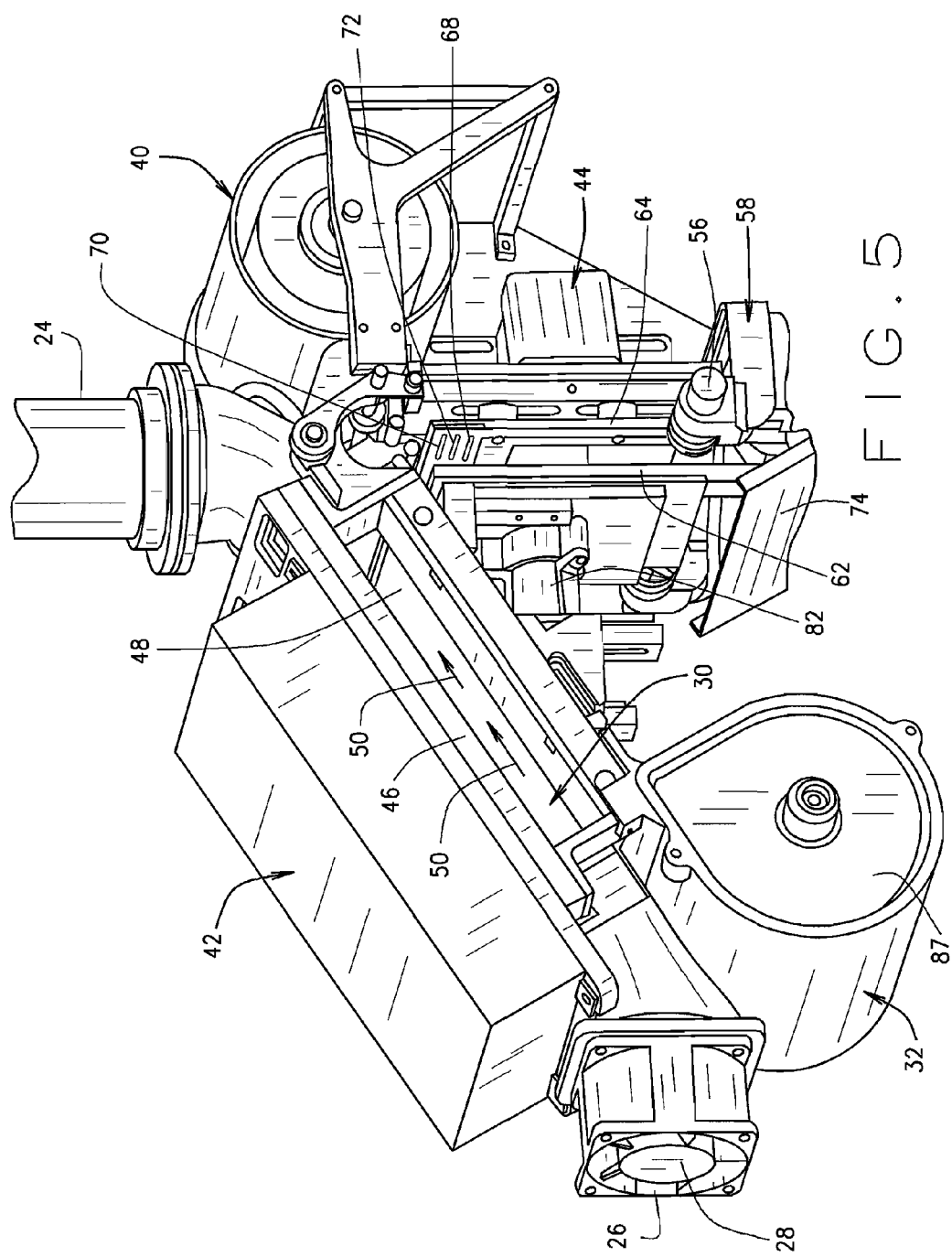
FIG. 5 is a partially enlarged perspective view of some of the components illustrated in FIGS. 3 and 4 including the collection zone and the heat-sealing plate members.
Figure 6:
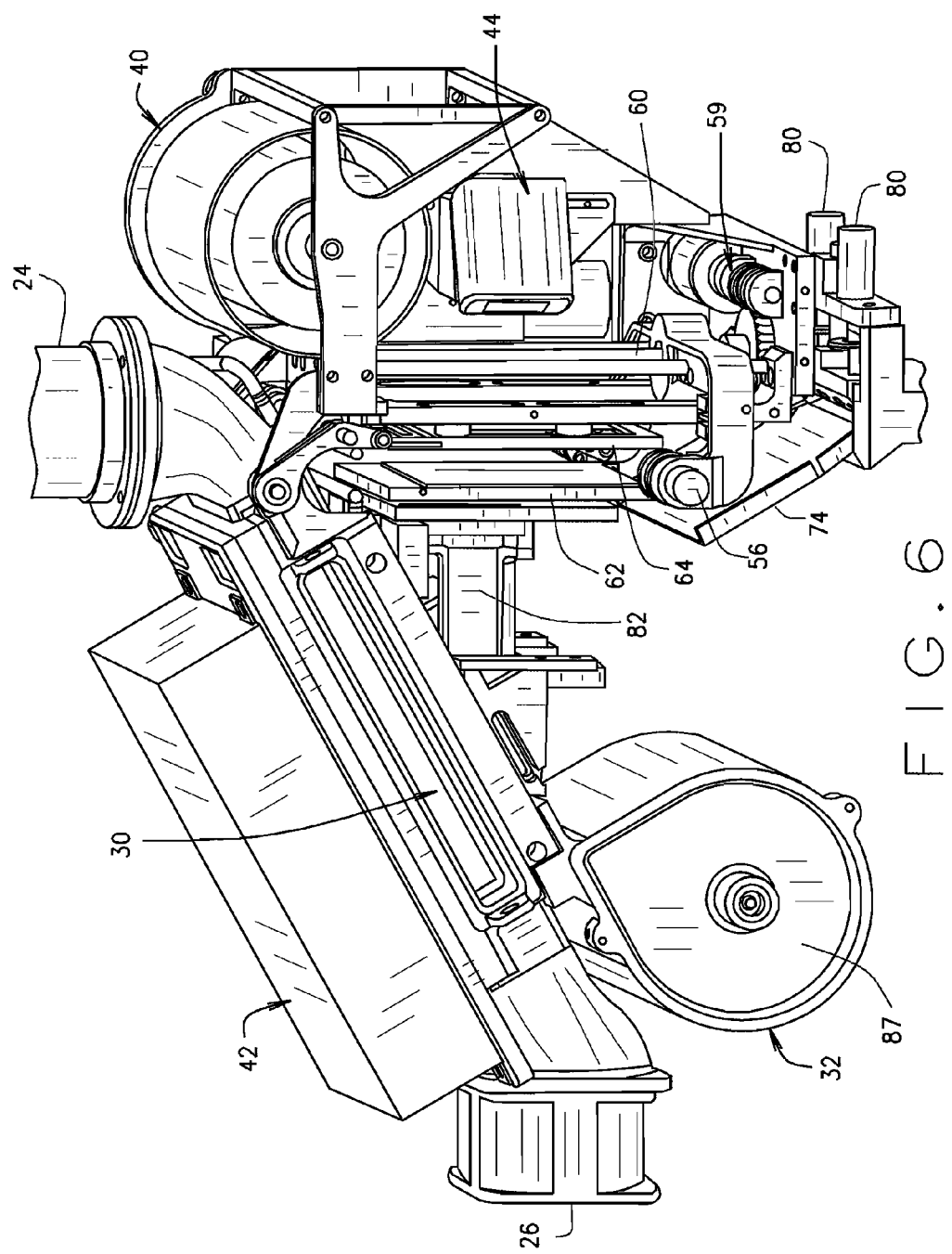
FIG. 6 is a partially enlarged perspective view similar to FIG. 5 taken from a different perspective showing still other components of the present system.

FIGS. 5 and 6 are partially enlarged perspective views showing the collection zone 30. Electrostatic precipitation technology in the form of at least one electrode (not shown) housed in the area 46 above the collection zone 30 and an oppositely charged collection surface 48 subject the air flow with the particulate matter contained therein which is drawn through and across the collection zone 30 to a corona discharge generated from the electrode. The particulate matter or aerosol particles moving through the collection zone become electrically charged and then migrate to the oppositely charged collection surface 48. In the embodiment illustrated in FIGS. 5 and 6, the collection surface 48 is a grounded plate which is covered by the advanceable tape or web material which overlays the collection surface 48 and moves through the collection zone in the direction of arrows 50. The electrode may be a nickel chromium wire having one end fixed to the high voltage power supply 42. The electrode may extend along the length of the ground plate forming the collection surface 48 and it can loop around a tensioning block and extend back along the length of the collection surface 48 parallel to itself and terminate near its initial stabilizing point. The length, number of electrodes, and the overall configuration of the electrodes will depend upon the strength of the electrostatic field necessary for collecting the particles of interest. The electrode is then charged to a high voltage that is compatible with the collection tape material.

The collection tape is stored on web roll feed reel 32 and is fed from reel 32 through the collection zone 30 in the direction of arrows 50 across the charged collection surface or grounded plate 48. Ambient air containing the aerosol particles or particulate matter are drawn into the air inlet 24 via the fan or other blower system 28 which is used to draw the air into inlet 24. In the embodiment disclosed herein, the air flow with the particulate matter contained therein is then drawn across the collection zone 30 in the opposite direction to the movement of the collection tape towards the air outlet 26. In this regard, it is recognized and anticipated that other embodiments of the present system 10 may draw the air flow across the collection zone 30 in the same direction or in any other direction including angularly related to the direction of movement of the collection tape within the collection zone 30. Regardless of the direction of movement the air flow across and through the collection zone, the collection tape is typically static or non-movable within the collection zone for a predetermined period of time during the collection process. Once the sample time has expired, the collection tape with the collected aerosol particles stored thereon is then moved into the pouch forming area 34 for preservation and storage and a clean sterile portion of the collection tape is moved into the collection zone 30 for collection and storage of another sample. This starting and stopping and advancement of the collection tape through the collection zone 30 and into the pouch forming area 34 is controlled by the on-board computer 43 and can be repeated any number of times depending upon the number of samples to be taken. The high voltage power supply unit 42 provides power to the at least one electrode and the collection surface 48 for creating the corona discharge and electrostatic field for charging the aerosol particles as they flow through the collection zone 30. In this regard, any plurality and any configuration of electrodes can be used and can be housed in the area 46 above the collection zone 30 depending upon the type of particles to be collected, the sampling times and frequencies, and the flow rate of the particles through the collection zone.

Figure 7:
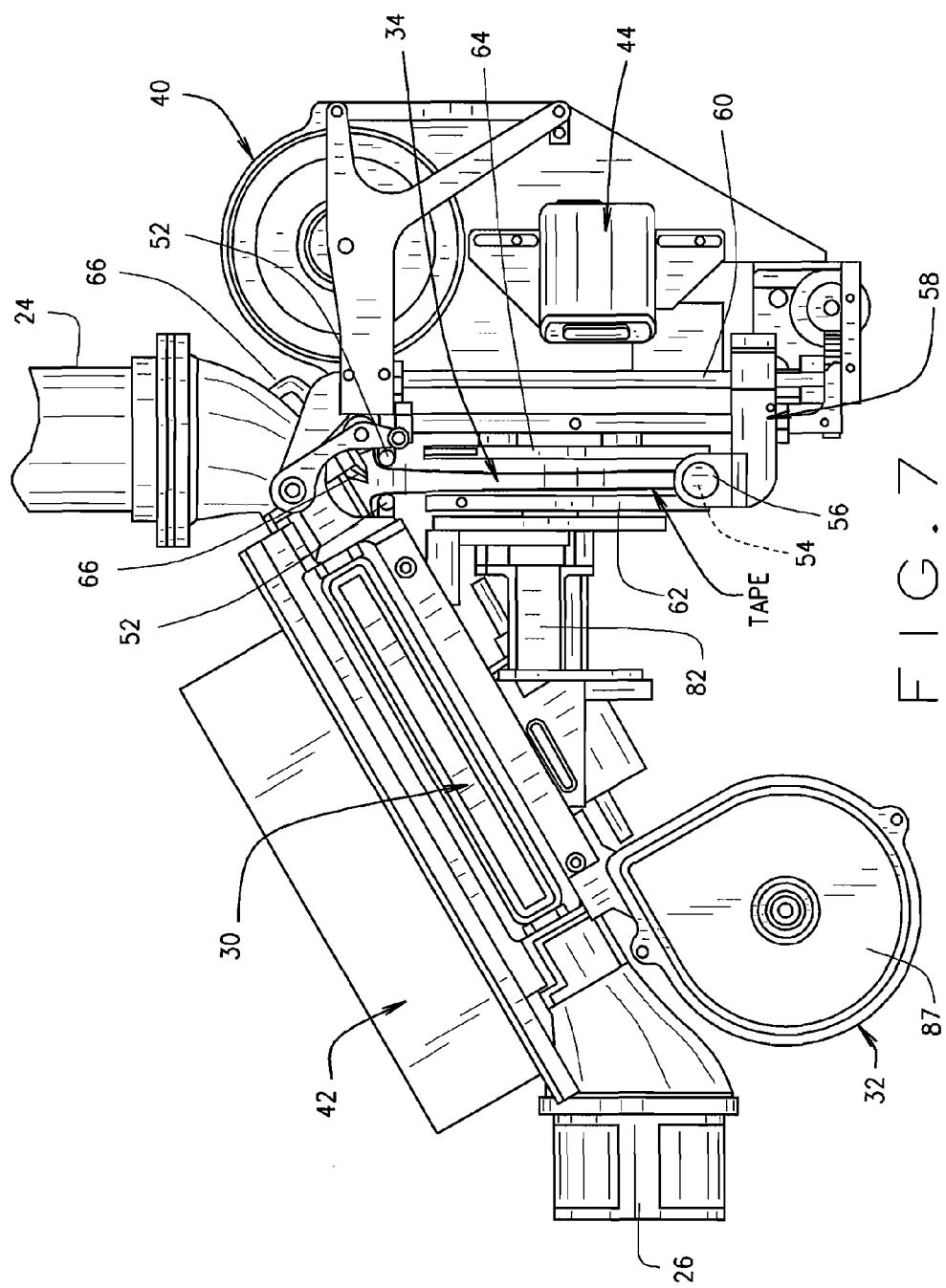
FIG. 7 is a partially enlarged view of FIG. 4 showing some components of the present system including the collection tape positioned within the pouch forming area.
Figure 8:
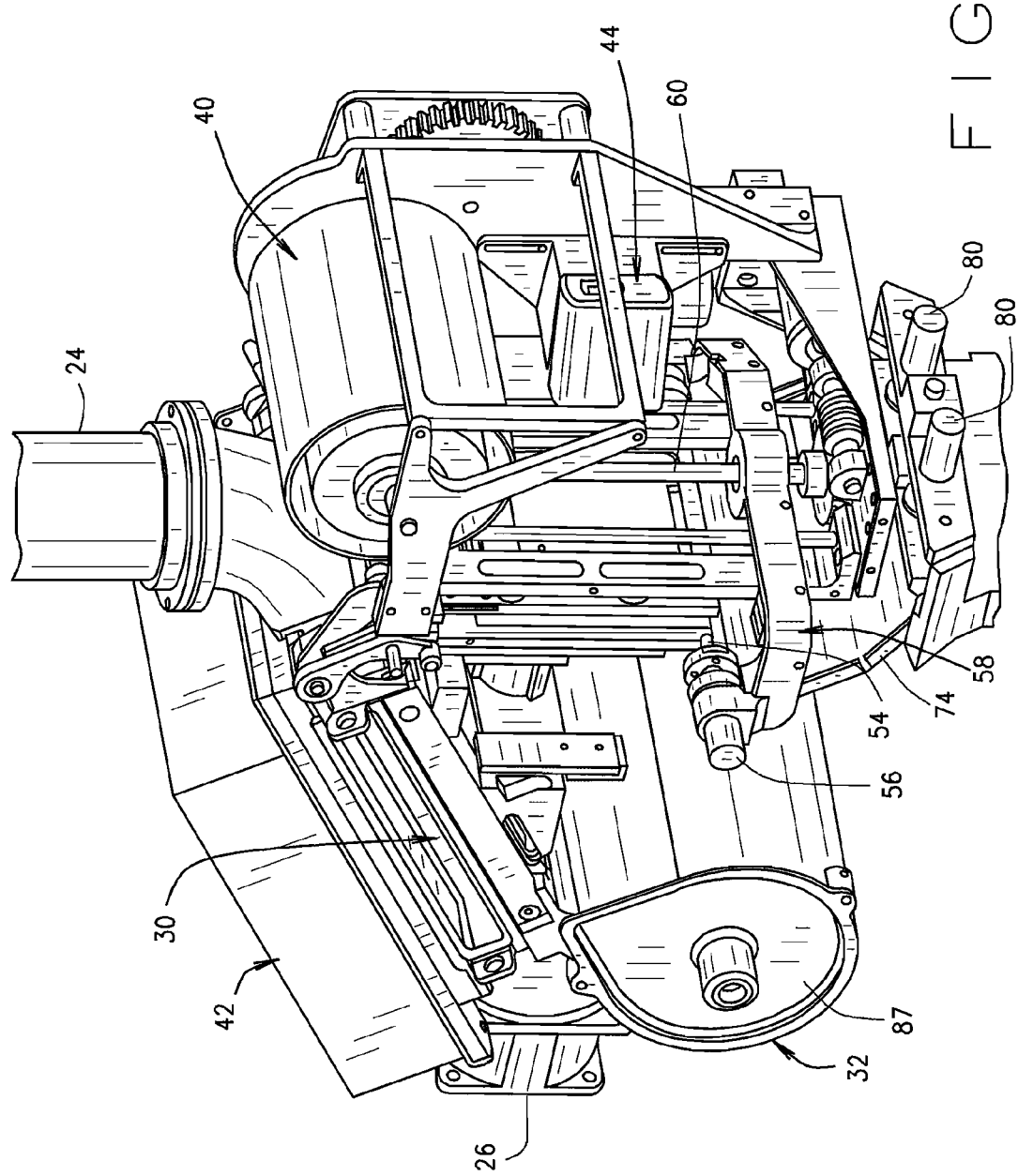
FIG. 8 is a partially enlarged perspective view of the present system taken from a different perspective showing the carriage platform in greater detail.

Once the collection tape is moved out of the collection zone 30 and into area 34, the collection tape is folded upon itself, heat-sealed and collection pouches are formed to preserve and store the collected particles therein for future analysis. In this regard, as best illustrated in FIGS. 7 and 8, once the collection tape is moved out of the collection zone 30, it passes across guides or roller members 52 which are positioned between the collection zone 30 and the take-up or storage reel 40 and above the pouch forming area 34. As best illustrated in FIGS. 5 and 8, a pair of spaced apart retractable pin members 54 are reciprocally movable in a vertical direction between their respective lower positions as illustrated in FIGS. 7 and 8 and their upper positions located adjacent guide members 52. Each respective pin member 54 is further movable in a horizontal direction via a respective solenoid 56 (FIGS. 5, 7 and 8) between its extended position as shown in FIG. 8 and a retracted position. The respective pin members 54 and corresponding solenoids 56 are carried on a carriage platform 58 which is vertically movable along a lead screw 60 (FIGS. 7 and 8), the platform 58 carrying and moving the pin members 54 between their upper and lower locations. The pin members 54 are used to move the collection tape such as the tape illustrated in FIG. 7 downwardly from its upper position located in the vicinity of guide members 52 to its lower position as illustrated in FIGS. 7 and 8. The pin members 54, when extended, extend over a top portion of the collection tape as will be hereinafter explained and move the collection tape downwardly in between a pair of plate members 62 and 64 when the carriage platform 58 is moved downwardly. The plate members 62 and 64 include heat sealing means for forming the sealed pouches. Movement of the cartridge platform 58 and activation of the respective solenoids 56 is controlled by the on-board computer system 43. Reciprocal movement of the carriage platform 58 can be accomplished using conventional means such as through the use of a conventional screw drive gear arrangement 59 illustrated in FIG. 8. Other means for reciprocally moving the carriage platform 58 are likewise envisioned and anticipated.

Forming of the sealed pouches occurs as follows. When the carriage platform 58 is positioned such that the pin members 54 are adjacent to or in the vicinity of the guide members 52, the pin members are extended by activation of the solenoids 56 and rest upon a top portion of the collection tape. As the carriage platform 58 is moved downwardly towards its fully down position with the pin members 54 extended, the collection tape is likewise moved downwardly in between the heat sealer plate members 62 and 64 as illustrated in FIG. 7 thereby positioning the collection tape in a folded position therebetween as shown in FIG. 7. The heat sealer plate members 62 and 64 are then moved into contact with each other thereby folding the collection tape lengthwise upon itself and two sides of the collection tape are pressed together and heat-sealed together to form a pouch having only one side remaining open. Since the collection tape is folded lengthwise upon itself, the bottom portion of the collection tape located between the respective pin members 54 forms the bottom portion of the pouch and once the heat sealer plate members 62 and 64 seal the respective vertical side portions of the folded tape, an open pouch is formed. At this time, a dispensing mechanism is used to inject a small portion of a buffer fluid into the open pouch prior to heat-sealing the final top portion of the pouch. The dispensing mechanism includes a retractable tube member 66 as best illustrated in FIG. 7 positioned above and between the pair of spaced apart guide members 52. Once the buffer fluid has been injected into the pouch, the open top portion of the pouch is heat-sealed along line 68 illustrated in FIG. 5 and, at the same time, the overlapped collection tape is likewise heat-sealed along line 70 located above line 68 as illustrated in FIG. 5. Once the collection tape has been heat-sealed at both locations 68 and 70, the collection tape is cut or severed at location 72 in between locations 68 and 70 thereby severing the formed sealed pouch from the rest of the collection tape. The onboard computer system 43 through the electronics package 45 controls movement of the carriage platform 58, movement of the heat sealer plate members 62 and 64, heat sealing and severing the collection tape, and dispensing the buffer fluid into each respective open sample pouch.

Cutting or severing the formed pouch from the remaining portion of the collection tape is accomplished via the heat sealer plate members 62 and 64 by merely burning completely through the folded over collection tape along line 72 (FIG. 5). Once the formed pouch is severed from the remaining collection tape, the totally sealed pouch containing the collected aerosol particles falls against guide plate member 74 (FIGS. 6-8) and member 74 funnels the severed pouch into an opening 76 associated with the top portion of the storage container 36 as best illustrated in FIGS. 4, 6 and 8. The stored sealed pouches then remain in the cold storage container 36 until needed for analysis at a future time. The thermo-electric cooler 38 controls the temperature of the storage container 36 based upon the type of aerosol particles collected. The cooled storage container 38 likewise includes an access door 78 (FIGS. 2-4) for providing access to the sample pouches stored therein. Solenoids 80 (FIG. 8) control the opening and closing of a door which covers the opening 76 to the cold storage container 36.

As best illustrated in FIGS. 6 and 7, solenoid 82 functions to move heat sealer plate member 62 into contact with heat sealer plate member 64. In the embodiment illustrated, plate member 64 is stationary and plate member 62 is movable into and out of contact with plate member 64. In this regard, it is recognized and anticipated that any arrangement for moving the respective heat sealer plate members 62 and 64 into contact with each other in order to accomplish the various heat sealing operations necessary to form the sealed pouches containing the aerosol particles and buffer fluid can be utilized including keeping plate member 62 stationary and moving only plate member 64, or moving both plate members 62 and 64 into contact with each other. Other heat-sealing configurations are likewise envisioned and anticipated. It is also recognized that the on-board computer system 43 in conjunction with the electronics package 45 will control all of the heat-sealing and severing applications as well as operation of the solenoids 80 and 82.

Once a particular sample pouch has been severed from the collection tape by applying heat at location 72 (FIG. 5), the remaining portion of the collection tape which has likewise been heat-sealed at location 70 continues to advance onto the storage or take-up reel 40. Heat-sealing the folded over collection tape at location 70 allows the collection tape to remain continuous for further advancement so that the next sample can be collected on a new portion of the collection tape which has been advanced into the collection zone 30. This collection process can be repeated at any predetermined time intervals and any plurality of sample pouches can be formed, heat-sealed, and severed for collection in the storage container 36 for evaluation and analysis at a later time. The sampling times, movement of the collection tape, sequencing of the samples through the collection zone, and other parameters associated with collecting and storing aerosol particles including the sampling rate, time and frequency are all user programmable through a user programmable interface and all such parameters are controlled by the on-board computer system. The user programmable interface allows a user to program a wide variety of different system parameters depending upon the particular application as will be hereinafter further explained.

The collection tape used in the present system is preferably coated with a water-soluble coating which allows for easy recovery of the collected particles and aids in the complete extraction of the collected material from the tape surfaces once the sealed pouches are removed for analysis. The water-soluble coating should be applied at least to the collection area of the tape in order to aid in recovery of the sample particulate particles. This coating should not be on the surfaces of the collection tape which are going to be heat-sealed as previously explained as the coating may degrade the sealing effect. The collection tape can be made from commercially available heat-sealable conductive polymer film materials which are then treated to achieve the desired end result. The resulting collection tape must be conductive, heat-sealable, and contain a water-soluble coating as explained above.

The water-soluble coating can be in the form of a gelatin such as a 50 mL deionized water per 1.308 grams Vyse Ordinance Gelatin from Gelatin Innovations, Inc. In this regard, it is recognized that other gelatins and concentrations will likewise work equally as well. With respect to its heat-sealable characteristics, the collection tape material should provide a strong bond when heat-sealed in order to seal and preserve the collected sample particles within each sample pouch. If a water-soluble coating is not used, recovery of the sample particles from the tape material for analysis purposes may be very difficult and the extraction process may destroy or degrade the sample particles. The collection tape material must not adversely affect the collection performance of the electrostatic precipitator. Since the collection tape is placed between the corona-generating electrode(s) and the electrically grounded collection surface 48, the presence of the collection tape will affect the electrical field. A collection tape that acts as an insulator will adversely affect the collection performance. As a result, a collection tape that acts as a conductor will not affect the collection performance. In some applications, an adhesive seal may be an option for certain applications.

Each sample pouch is likewise pre-marked with a bar code serial number or other data identification means. The bar code can be prepositioned on the tape material at predetermined intervals along its entire length during manufacture or preparation of the collection tape, or a mechanism can be inserted into the overall system 10 to apply a bar code onto the collection tape as the tape leaves the web roll 32 and before it enters the collection zone 30. It is also recognized and anticipated that the mechanism for applying a bar code onto the tape material of the present system could likewise be inserted into the present system such that the bar code is applied onto each pouch as each individual pouch is being formed prior to such pouches being severed and stored in the storage container 36. Other mechanisms and locations for inserting a plurality of bar codes onto the collection tape material at predetermined locations are likewise recognized and anticipated.

In the particular embodiment illustrated in FIGS. 1-8, the bar code has been pre-applied to the collection tape at predetermined intervals prior to insertion onto the web roll 32 for use in the present system. Bar code scanner 44 (FIGS. 4, 7 and 8) will automatically read the bar code associated with the pouch being formed and the on-board computer system 43 will record the serial number associated with the bar code and will automatically associate and store all data associated with that particular sample pouch such as date, collection time, sample flow rate, collection start and stop times, and other pertinent information with the corresponding bar code. All of this data will be stored and associated with the particular bar code serial number for retrieval when that particular pouch will be analyzed at a future time. This data may be retrievable through a secure remote access line, or other means associated with the present system 10. Again, the sample flow rate, start/stop times, sample duration and frequency are all user programmable and can be set and changed by a user through the user interface. In addition, an aerosol counter/sizer can likewise be incorporated into the present system 10 and this data can likewise be stored in the database and retrievable at a future time. Access to the stored sealed pouches with their associated bar codes can be achieved by removing or opening the appropriate access panel associated with the housing 12 such as access panel 14 and removing the individually stored pouches from the cold storage container 36 through the access door 78.

In another embodiment of the present system 10, it is recognized and anticipated that once the pouches are heat-sealed to the collection tape, they can remain on the collection tape and can be collected and stored on the take-up or storage reel 40 in a temperature controlled environment similar to the storage container 36. This would be accomplished using the same system illustrated in FIGS. 1-8 except that the sever line 72 associated with the heat-sealing plate members 62 and 64 as well as additionally heat-sealing the collection tape at heat-sealing location 70 would be eliminated from the present system 10. As a result, after the formed collection pouch is sealed at heat-sealing location 68, advancement of the collection tape would draw the formed sealed pouch out of the area 34 and onto the take-up or storage reel 40. In this particular embodiment, the configuration of the take-up reel 40 may be modified to include sufficient space for storing a plurality of sealed pouches on reel 40 as well as including cooler means for cooling the stored samples on the reel 40 to the appropriate temperature. In this regard, the cooler means could be associated with the reel 40 which could be enclosed or contained within a housing or compartment (not shown) positioned around the reel 40. It is also recognized and envisioned that the stored samples could be conductively cooled through the reel 40 itself. Storing the sealed pouches on the take-up reel 40 eliminates the need to cut or sever the tape as previously explained. The take-up reel 40 can then be unrolled and the individual pouches manually severed from the tape for future analysis. In this regard, any sample of interest can be located via the bar code and removed for processing. To remove a sample, the user will simply cut the pouch from the strip of pouches. The individual sample pouches will remain sealed. The pouch containing the sample of interest will then be cut open and analyzed. In this particular embodiment, it is also recognized and anticipated that the take-up reel 40 could be relocated on the present system 10 below or adjacent to area 34 since the cold storage container 36 is not needed in this embodiment. Other arrangements and configurations are likewise recognized and anticipated.

Figure 9:
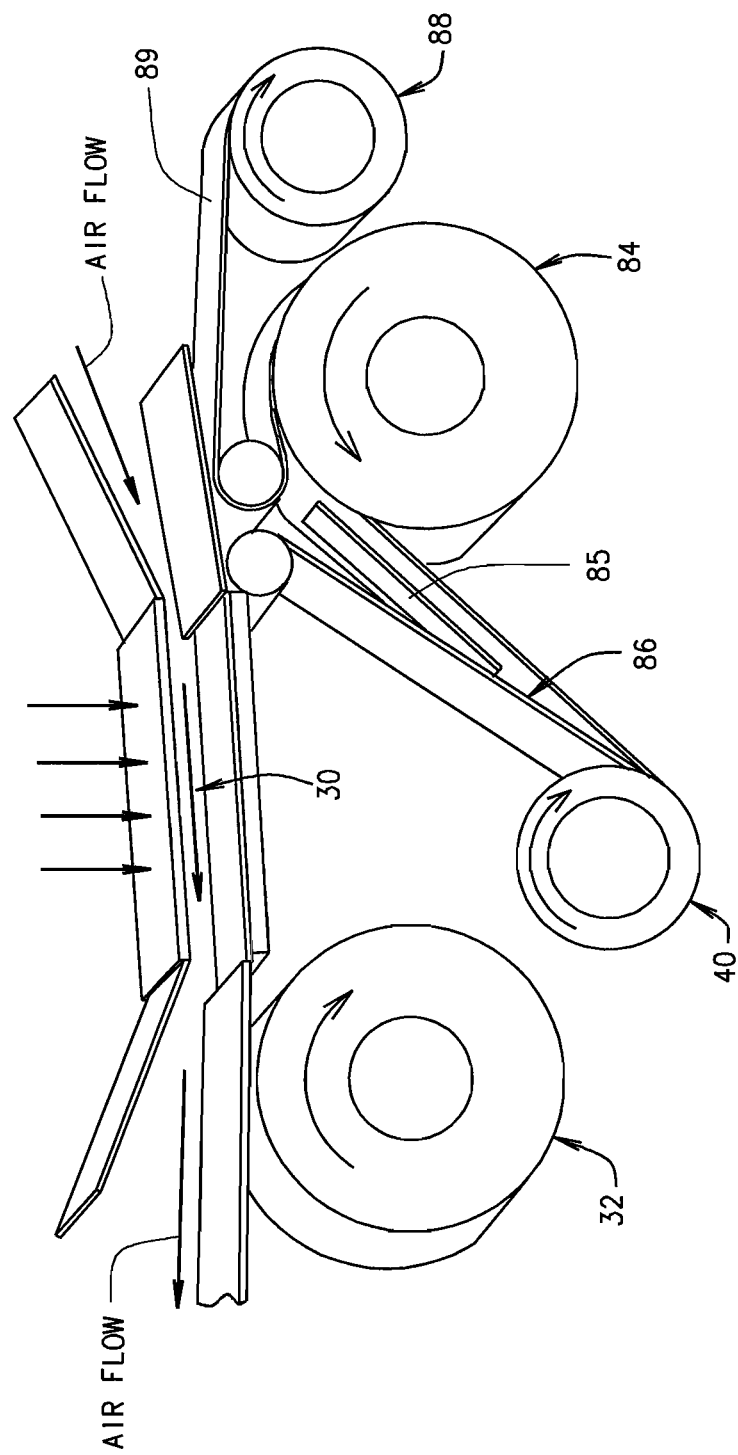
FIG. 9 is a schematic representation illustrating still another embodiment of the present aerosol collection and storage system constructed in accordance with the teachings of the present invention.

In still another embodiment of the present system illustrated in FIG. 9, the preservation or buffer fluid can be pre-applied to a microfiber pad 85 which is stored on a tape and unrolled from an additional reel 84 and placed in contact with the collected particles on the collection tape. FIG. 9 is a schematic overview of this embodiment of the present system showing only the roller or reel configuration which would be used to accomplish attachment of a plurality of the moistened pads to the collection tape. As illustrated in FIG. 9, once the collection tape passes through the collection zone 30, it will be directed towards take-up reel 40. The moistened pads 85 are positioned and stored on a tape material which is unrolled from reel 84 and are protected from exposure to ambient conditions by a protective cover 89. The moistened pads 85 are prepositioned at spaced apart locations on the tape material and the protective cover 89 overlays both the tape material and the moistened pads 85 contained thereon. As the tape containing the unexposed moistened pads is unrolled from reel 84, the protective cover 89 is removed and channeled to a take-up reel 88 for storing the protective cover as it is removed from the tape material holding the moistened pads 85. At the same time, the exposed moistened pads 85 are unrolled from the reel 84 and are placed in contact with the collected material on the collection tape and the moistened pad is sealed to the collection tape in the vicinity of area 86 illustrated in FIG. 9. When the tape containing the moistened pads is placed in contact with the collection tape as illustrated in FIG. 9, these two tapes form a sealed pocket around the sample particles. At this time, the moistened pad 85 is sealed in contact with the collection tape and the, two tapes are stored on the storage or take-up reel 40 as previously explained.

Sealing of the two tapes together can occur through the use of an adhesive on either the collection tape or the tape holding the moistened pads, or via heat-sealing means as explained with respect to FIGS. 1-8. In the event that the two tapes are heat-sealed together at location 86, reel 84 holding the unexposed moistened pads 85 can be properly positioned such that both the collection tape and the tape holding the moistened pads will be fed in between heat-sealing plate members 62 and 64 as previously explained. In this arrangement, take-up reel 40 would be moved and located in another location such as the location illustrated in FIG. 9. In the event that sealing of the collection tape and the tape holding the moistened pads is achieved via adhesive sealing, the heat-sealing plate members 62 and 64 can be removed from the present system and reels 84 and 88 can be properly positioned within the overall system to accomplish the mating and sealing of the collection tape and the tape holding the moistened pads as previously explained. Again, the small volume of buffer fluid contained in the moistened pads is included in each pouch formed in order to help maintain the viability of the sample.

Still further, if heat-sealing plate members 62 and 64 are utilized for sealing the collection tape to the tape holding the moistened pads in the embodiment illustrated in FIG. 9, it is recognized and anticipated that the sealed pouches or pockets formed around the sample can likewise be stored on take-up reel 40 in a cooled environment as previously explained, or the sealed pockets could likewise be severed from the collection tape in the manner described with respect to FIG. 5 for storage in a cold storage container such as the container 36. In this particular embodiment, the collection tape would again be heat-sealed at a location 70 above the severing location 72 so that the collection tape will remain continuous for further advancement so that the next sample can be collected in the collection zone 30 and can be moved into contact with the moistened pads as previously explained.

The collection tape stored for use on reel 32 can be easily inserted and removed from the reel 32 similar to loading film into a camera. New sterilized collection tapes can be provided in consumable cartridges which can be easily replaced and positioned for operative use on reel 32. In this regard, reel 32 includes a removable cover 87 (FIGS. 2-4) which can be easily removed for providing access to the stored sterilized collection tape contained therewithin. In one embodiment, the stored sterilized collection tape will be contained on a separate reel inside a consumable cartridge which can be positioned on or within reel 32 and fed through appropriate openings for advancement through the present system 10 as previously explained. The sample consumable cartridge will provide secondary containment to the collection tape for safe transport to the present system 10.

In the embodiment illustrated in FIG. 9, the stored unexposed moistened pads 85 can likewise be provided on a tape material in consumable cartridges which can likewise be easily replaced and inserted onto reel 84. Reel 84 could be similarly configured as reel 32 and could include a removable cover for enclosing the moistened pads within a structure similar to the structure associated with reel 32. Other configurations and arrangements for removing and replacing the collection tape onto reel 32 and the moistened pads onto reel 84 are likewise recognized and anticipated. Still further, in the embodiment where the sample collection pouches are stored on the take-up reel 40, the stored collection pouches and tape could be contained on reel 40 which is likewise located inside another consumable cartridge. In this embodiment, the consumable cartridge holding and storing the sample collection pouches will again provide secondary containment to the samples for safe transport.

After the sample particulate matter has been stored in any one of the embodiments discussed above, any sample of interest can be easily located via the bar code and removed for processing. To remove a particular sample, the operator will locate the appropriate sample collection pouch which is either stored in the storage container 36, or is stored on the take-up reel 40, and the appropriate sample pouch will be removed or severed from the collection tape. Depending upon the final configuration of the sample pouch, an appropriate recovery procedure or protocol will be used to extract the sample particulate matter from the sample pouch.

The present aerosol collection and storage system 10, in any of its embodiments as disclosed herein, can be optimized by varying field density and collection zone length to achieve any stated particle capture efficiency requirement for a particular range of particle sizes and flow rates. Electrostatic precipitation is ideal for collecting aerosols in the size range of 0.25 to 10 μm. The present system can be optimized for this size range as well as other ranges. In addition, it is recognized and anticipated that the collection process can likewise be changed so long as the collected aerosol particles are captured on the collection tape. Because electrostatic attraction is the preferred collection mechanism, efficient collection of the aerosol particles can be maintained over a greater range of sampling rates as compared to inertial based collectors. Collection of biological particles using electrostatic precipitation does not affect the viability of the particles. In addition, using selected buffer fluids in a sealed sample pouch as explained further maintains the viability of the sample particles.

The present system 10 will likewise have a user programmable sample collection period of variable duration. An operator will be able to terminate the sample collection cycle at any point and retrieve the sample collected. An operator will also be able to program various parameters associated with the collection process prior to initiating the collection process as previously explained. In this regard, when the present system is initially powered up, the fan 28, the thermoelectric cooler 38 associated with the storage compartment 36, the on-board computer 43, and all of the electronics 45 associated with the present system will turn on at pre-set levels. The fan 28 will spin at a predetermined speed although the fan speed can likewise be controlled through the user interface with a PWM (pulse width modulated) signal. In this regard, the user interface is typically achieved through another external computer which is connected to the on-board computer 43 over an Ethernet line. This connection can be achieved through the use of an external port or communication plug such as the connection plug 92 illustrated in FIG. 1 for attaching the Ethernet line to the present system 10 without opening any of the panels or doors associated with the housing 12. This saves time and allows a user to select and program the appropriate parameters into the on-board computer 43 through the use of the external computer. Once the particular parameters and configurations of the collection process are set, the external computer can be removed and disconnected as the on-board computer controls all operations of the present system 10 and controls the collection and storage process once initiated. In this regard, the present system 10 may include a power switch 94 (FIG. 1) for initially powering up the unit 10 and programming the same, and the present system may include an additional on/off switch 96 (FIG. 1) which is likewise accessible from the exterior of the housing 12 to begin the collection and storage operation and which turns on the high voltage power supply 42 for initiating operation of the electrostatic precipitator. The high voltage output supply 42 can likewise be controlled with a varying input voltage controlled by the on-board computer 43.

The electronics package 45 associated with the present system 10 will likewise include on-board data storage capability for recording system status, collection times, date and other pertinent information associated with each of the collected samples. This data is likewise retrievable with the sample pouches or through a secure remote access line. The present system is also portable and is designed to autonomously operate for an extended period of time on 110 volt AC power through the use of a power plug such as power plug 98 (FIG. 1). Due to the low power requirements of electrostatic precipitators, the present system 10 may also include an internal battery 90 (FIG. 2) capable of several hours of fully operational collection time in the event of a power outage. For example, the present system 10 could operate for 12 hours while sampling at 300 lpm using a 3.2-lb. UBI-2590 battery.

It is also recognized and anticipated that an operator can likewise operate and control the functions of the present system from a remote location over the Ethernet line if so desired. Still further, a user interface could likewise be incorporated into the on-board electronics package 45 and a user interface screen or other interface controller device could be associated with the exterior portion of the housing 12 to enable an operator to program the on-board computer 43 at the unit 10 instead of using an Ethernet line. Other programmable means for setting the system configuration and parameters and for controlling the operation of the present system 10 are likewise recognized and anticipated. In addition, the present system may likewise include on-board diagnostic tests for insuring that the present system is fully operational without defects at all times, and may include one or more LED lights or indicators such as the indicators 100 (FIG. 1) for indicating the status or operational capability of various portions or components of the present system 10. The present system may also provide a user with the option of selecting whether to sever the foamed sealed pouches from the collection tape, or to store the sealed pouches on the take-up reel. Other electronic control systems are likewise recognized and anticipated and can be used to control the operation of the present system 10 and other embodiments and configurations of the present system 10 are likewise recognized and anticipated.

Thus, there has been shown and described several embodiments of a novel reel-to-reel bioforensic aerosol collection and storage system which is capable of acquiring multiple samples of particulate particles over an extended period of time with user selectable sampling parameters, which system fulfills all the objects and advantages sought therefor. Many changes, modifications, variations and other uses and applications of the present invention will, however, become apparent to those skilled in the art after considering this specification and the accompanying drawings. All such drawings, modifications, variations and other uses and applications which do not depart from the spirit and scope of the present invention are deemed to be covered by the present invention.

The invention claimed is:

1. An aerosol collection and storage system for capturing and storing aerosol particles comprising:
   an inlet for receiving ambient air into the system;
   an outlet for allowing ambient air to exit the system;
   a collection zone for receiving the ambient air from said inlet;
   a first feed reel for holding an unexposed collection tape for movement through said collection zone;
   a second take-up reel for receiving and storing the collection tape from said first feed reel, said collection tape being movable from said first feed reel through said collection zone and onto said second take-up reel;
   means for collecting the aerosol particles contained within the ambient air which passes through said collection zone onto that portion of the collection tape located within said collection zone;
   a pouch forming mechanism located between said collection zone and said second take-up reel, said pouch forming mechanism including apparatus for folding the collection tape containing the collected aerosol particles onto itself;
   a dispensing mechanism for injecting a fluid into the folded collection tape containing the collected aerosol particles;
   heat sealing means for sealing a portion of the folded collection tape to form a sealed pouch containing the collected aerosol particles and the injected fluid;
   heat sealing means for heat sealing the folded collection tape at a location above the sealed pouch;

means for severing the folded collection tape at a location between the sealed pouch and the heat sealed location above said sealed pouch; and a storage container for receiving the severed sealed pouch.

2. The aerosol collection and storage system defined in claim 1 wherein said collection tape remains stationary for a predetermined period of time within said collection zone during the collection of the aerosol particles onto that portion of said collection tape located therein.

3. The aerosol collection and storage system defined in claim 1 wherein said means for collecting the aerosol particles contained within the ambient air onto that portion of the collection tape located within said collection zone includes an electrostatic precipitator system for electrically charging the aerosol particles as they flow through said collection zone.

4. The aerosol collection and storage system defined in claim 3 wherein said electrostatic precipitator system includes at least one electrode and an oppositely charged collection surface, said collection tape being movable between said at least one electrode and said oppositely charged collection surface.

5. The aerosol collection and storage system defined in claim 1 wherein said collection tape is coated with a water soluble material.

6. The aerosol collection and storage system defined in claim 1 wherein said means for severing the folded collection tape includes heat severing means.

7. The aerosol collection and storage system defined in claim 1 wherein said system is portable.

8. The aerosol collection and storage system defined in claim 1 wherein said storage container is temperature controlled.

9. The aerosol collection and storage system defined in claim 1 including a blower system for drawing ambient air into said inlet.

10. The aerosol collection and storage system defined in claim 1 including means for advancing the collection tape unto said second take-up reel after the sealed pouch has been severed therefrom.

11. The aerosol collection and storage system defined in claim 10 wherein said means for advancing the said collection tape onto said second take-up reel includes an electronic control system for sequentially moving a portion of said collection tape into and out of said collection zone.

12. The aerosol collection and storage system defined in claim 1 wherein said apparatus for folding the collection tape includes a reciprocally movable carriage platform, said carriage platform including a pair of spaced apart retractable and extendable pin members and being movable between a first position wherein said pin members, when extended, extend over a portion of said collection tape, and a second position wherein said pin members are engaged with said collection tape and have positioned said collection tape in a folded configuration.

13. The aerosol collection and storage system defined in claim 1 wherein said heat sealing means includes a pair of plate members, said pair of plate members being positioned and located such that said folded collection tape is positioned therebetween, said pair of plate members being movable into contact with each other and including heat sealing portions for sealing said formed pouch.

14. The aerosol collection and storage system defined in claim 1 including an onboard computer system and an associated electronics package for controlling and sequencing all of the operations of said system.

15. The aerosol collection and storage system defined in claim 14 including a user programmable interface for allowing a user to program system parameters for controlling the operation of said system.

16. The aerosol collection and storage system defined in claim 15 wherein said programmable system parameters include sample flow rate, collection start/stop times, collection duration time and frequency, and temperature of storage container.

17. The aerosol collection and storage system defined in claim 14 including data storage capability for recording the date, sample flow rate, and collection start and stop times for each formed sealed pouch containing the collected aerosol particles therewithin.

18. The aerosol collection and storage system defined in claim 1 wherein said collection tape is sequentially moved through said collection zone for collecting and storing a plurality of formed sealed pouches, each sealed pouch containing collected aerosol particles.

19. The aerosol collection and storage system defined in claim 1 wherein said sealed pouch includes identification means relating to the collected aerosol particles contained therein.

20. The aerosol collection and storage system defined in claim 19 wherein said identification means includes a barcode associated with each respective sealed pouch for identifying the collected aerosol particles contained therein.

21. The aerosol collection and storage system defined in claim 20 including an onboard computer system for recording the barcode associated with each respective sealed pouch.

22. The aerosol collection and storage system defined in claim 21 including a barcode scanner for automatically reading the barcode associated with each respective sealed pouch, said onboard computer system associating each respective barcode with data associated with the collected aerosol particles stored in each respective sealed pouch.

23. The aerosol collection and storage system defined in claim 22 wherein the data associated with the collected aerosol particles stored in each respective sealed pouch includes date, sample flow rate, and collection start and stop times.

24. An aerosol collection and storage system for capturing and storing aerosol particles comprising:

an inlet for receiving ambient air into the system;

an outlet for allowing ambient air to exit the system;

a collection zone for receiving ambient air from said inlet;

a first reel for holding an unexposed collection tape for movement through said collection zone;

a second reel for receiving and storing said collection tape from said first reel, said collection tape being sequentially movable from said first reel through said collection zone and onto said second reel;

an electrostatic precipitator system for collecting aerosol particles contained within the ambient air onto that portion of said collection tape located within said collection zone as the ambient air passes through said collection zone;

a pouch forming mechanism located between said collection zone and said second reel, said pouch forming mechanism including a pair of plate members positioned in spaced apart relationship relative to each other and a pair of spaced apart retractable and extendable pin members, said pin members being movable between a first position wherein said pin members, when extended, extend over a portion of said collection tape and a second position wherein said pin members, when extended, engage said collection tape and position said collection tape in a folded arrangement between said pair of plate members, said plate members being movable into engagement with each other thereby folding the collection tape onto itself in an overlapped configuration, the collected aerosol particles being positioned between said overlapped collection tape portions, said plate members having portions thereof for heat sealing the side edges of the overlapped collection tape portion to form a pouch having one side open;

said pair of plate members further including a portion thereof for heat sealing the open portion of said pouch for forming a sealed pouch containing the collected aerosol particles;

said pair of plate members further including a portion thereof for heat sealing the overlapped collection tape at a location above the sealed pouch;

said pair of plate members further including a portion thereof for heat severing said overlapped collection tape at a location between said sealed pouch and the heat sealed location above said sealed pouch;

a storage container for receiving the sealed pouch when severed from said collection tape; and control means for advancing said collection tape onto said second reel after said sealed pouch has been severed therefrom.

25. The aerosol collection and storage system defined in claim 24 including a dispensing mechanism for injecting a buffer fluid into the open side portion of said pouch prior to heat sealing said open portion to faun a sealed pouch.

26. The aerosol collection and storage system defined in claim 24 including an onboard computer system and an associated electronics package for controlling the sequential movement of the collection tape through said collection zone, the movement of said pair of spaced pin members and said pair of plate members, the operation of said dispensing mechanism, and the operation of said heat sealing portions associated with said pair of plate members.

27. The aerosol collection and storage system defined in claim 26 wherein said onboard computer system controls the sample flow rate, the collection start and stop times, and the collection duration time and frequency.

28. The aerosol collection and storage system defined in claim 26 including a user programmable interface for allowing a user to program system parameters for controlling the operation of said system.

29. The aerosol collection and storage system defined in claim 26 including data storage means for recording and storing the date, collection start and stop times, and sample flow rate for each sealed pouch containing the collected aerosol particles therewithin.

30. The aerosol collection and storage system defined in claim 29 wherein each sealed pouch has a barcode associated respectively therewith, said onboard computer system being configured to read and record the barcode associated with each respective sealed pouch and to associate and store the date, collection start and stop times, and sample flow rate for the collected aerosol particles associated with each such sealed pouch with the corresponding barcode.

31. An aerosol collection and storage system for capturing and storing aerosol particles comprising:
an inlet for receiving ambient air into the system;
an outlet for allowing ambient air to exit the system;
a collection zone for receiving ambient air from said inlet;
a first reel for holding an unexposed collection tape for movement through said collection zone;
a second reel for receiving and storing said collection tape from said first reel, said collection tape being sequentially movable from said first reel through said collection zone and onto said second reel;
an electrostatic precipitator system for collecting aerosol particles contained within the ambient air onto that portion of said collection tape located within said collection zone as the ambient air passes therethrough;
a pouch forming mechanism located between said collection zone and said second reel, said pouch forming mechanism including a pair of plate members positioned in spaced apart relationship to each other and a pair of spaced apart retractable and extendable pin members which are reciprocally movable between a first position wherein said pin members, when extended, extend over a portion of said collection tape and a second position wherein said pin members, when extended, engage said collection tape and position said collection tape in an overlapping arrangement between said pair of plate members, said plate members being movable into engagement with each other thereby pressing said collection tape onto itself in an overlapped configuration, the collected aerosol particles being positioned between said overlapped collection tape portions;
said plate members having portions associated therewith for heat sealing the side edges of the overlapped collection tape portions to form a pouch having one side open;
a dispensing mechanism for injecting a buffer fluid into the open side portion of said pouch;
said pair of plate members further including a portion thereof for heat sealing the open side portion of said pouch for forming a sealed pouch containing the collected aerosol particles and the injected fluid therewithin; and
control means for advancing said collection tape and said sealed pouches onto said second reel for storage thereon.

32. The aerosol collection and storage system defined in claim 31 wherein said second reel and the sealed pouches stored thereon are in a temperature controlled environment.

33. The aerosol collection and storage system defined in claim 31 wherein the sealed pouches stored on said second reel are conductively cooled through said second reel.

34. The aerosol collection and storage system defined in claim 31 wherein each sealed pouch includes a barcode for identifying the collected aerosol particles associated with each respective sealed pouch.

35. The aerosol collection and storage system defined in claim 34 including an onboard computer system for recording the barcode associated with each respective sealed pouch and for associating each such barcode with data associated with the collected aerosol particles stored in each respective sealed pouch including date, sample flow rate, and collection start and stop times.

36. An aerosol collection and storage system for capturing and storing aerosol particles comprising:
an inlet for receiving ambient air into the system;
an outlet for allowing ambient air to exit the system;
a collection zone for receiving the ambient air from said inlet;
a first reel for holding an unexposed collection tape for movement through said collection zone;
a second reel for receiving and storing said collection tape from said first reel, said collection tape being movable from said first reel through said collection zone and onto said second reel;
an electrostatic precipitator system for collecting aerosol particles contained within the ambient air onto that portion of said collection tape located within said collection zone as the ambient air passes through said collection zone;

said collection tape being stationary for a predetermined period of time within said collection zone during the collection of the aerosol particles onto that portion of said collection tape located therein;

a third reel for holding at least one unexposed moistened pad stored on a tape material and covered with a protective cover, said moistened pad tape material being movable into contact with said collection tape after aerosol particles are collected thereon;

a fourth reel positioned and located for receiving and storing the protective cover associated with the moistened pad tape material as such protective cover is removed from such tape material en route to contact with said collection tape thereby exposing the at least one moistened pad;

said exposed at least one moistened pad being moved into contact with the collected aerosol particles on said collection tape after removal of said protective cover;

means for sealing the exposed at least one moistened pad to the collected aerosol particles on said collection tape when said at least one moistened pad is placed in contact with the collected aerosol particles; and means for advancing the collection tape and associated moistened pad onto said second reel after the tape material containing said at least one moistened pad is sealed to said collection tape.

37. The aerosol collection and storage system defined in claim 36 wherein said moistened pad tape material is sealed to said collection tape through the use of adhesive means.

38. The aerosol collection and storage system defined in claim 36 wherein said moistened pad tape material is sealed to said collection tape through the use of heat sealing means.

39. The aerosol collection and storage system defined in claim 36 wherein said at least one moistened pad includes a buffer fluid for preserving and maintaining the viability of the collected aerosol particles for future extraction and analysis.

40. The aerosol collection and storage system defined in claim 36 wherein said moistened pad tape material includes a plurality of unexposed moistened pads, and wherein said collection tape is sequentially moved through said collection zone for collecting and storing a plurality of different groups of aerosol particles at spaced locations on said collection tape, and wherein said exposed moistened pads are sequentially moved into contact with the plurality of different groups of collected aerosol particles on said collection tape for storage on said second reel.

* * * * *

UNITED STATES PATENT AND TRADEMARK OFFICE
CERTIFICATE OF CORRECTION

| | | |
|---|---|---|
| PATENT NO. | : 8,506,686 B2 | Page 1 of 1 |
| APPLICATION NO. | : 13/019494 | |
| DATED | : August 13, 2013 | |
| INVENTOR(S) | : Joseph M. Langle et al. | |

It is certified that error appears in the above-identified patent and that said Letters Patent is hereby corrected as shown below:

In the Specification:

In Col. 14, line 18, delete "foamed" and replace with -- formed --

In the Claims:

In Claim 25, Col. 17, line 29, delete "faun" and replace with -- form --

Signed and Sealed this
Twenty-fifth Day of February, 2014

Michelle K. Lee
*Deputy Director of the United States Patent and Trademark Office*